(12) United States Patent
Vontobel (10) Patent No.: US 6,431,562 B1
(45) Date of Patent: Aug. 13, 2002

(54) VEHICLE FOR GLIDING OVER THE GROUND

(76) Inventor: Hansrudolf Vontobel, Im Dorf 6, Herrliberg (CH), 8704

( * ) Notice: Subject to any disclaimer, the term of this patent is extended or adjusted under 35 U.S.C. 154(b) by 0 days.

(21) Appl. No.: 09/402,035

(22) PCT Filed: Mar. 31, 1998

(86) PCT No.: PCT/CH98/00121

§ 371 (c)(1),
(2), (4) Date: Sep. 28, 1999

(87) PCT Pub. No.: WO98/43862

PCT Pub. Date: Oct. 8, 1998

(30) Foreign Application Priority Data

Apr. 1, 1997 (CH) .................................................. 751/97

(51) Int. Cl.$^7$ ................................................ B62B 9/04
(52) U.S. Cl. ...................................... 280/28.14; 280/20
(58) Field of Search .................. 280/18, 21.1, 28.14, 280/20, 601, 603, 606, 612, 613, 634, 636

(56) References Cited

U.S. PATENT DOCUMENTS

| 27,189 | A | * | 2/1860 | Lamb | ............................ 280/20 |
| 3,139,287 | A | * | 6/1964 | Annis | ......................... 280/21.1 |
| 3,325,179 | A | | 6/1967 | Bissett | |
| 3,560,012 | A | * | 2/1971 | Auer | ............................ 280/20 |
| 3,912,031 | A | * | 10/1975 | Goulet | ......................... 180/9.26 |
| 3,917,301 | A | | 11/1975 | Fabris | |
| 4,193,609 | A | | 3/1980 | Bissett | |
| 4,503,922 | A | * | 3/1985 | Brosh et al. | ......... 177/210 EM |
| 4,638,896 | A | | 1/1987 | Poyser | |

FOREIGN PATENT DOCUMENTS

| CH | 504 876 | 3/1971 |
| DE | 36 33 773 | 4/1988 |

* cited by examiner

*Primary Examiner*—Douglas Hess
*Assistant Examiner*—Elaine Gort
(74) *Attorney, Agent, or Firm*—Oppedahl & Larson LLP (57) ABSTRACT

The ground gliding vehicle has a gliding part (1) facing the ground, a supporting structure 2 placed upon it and a seating structure (3) attached to this supporting structure (2). On the supporting structure (2) and/or on the seating structure (3), means (5) for holding on are attached. The supporting structure (2) is equipped with a shock absorber (4) for absorbing bumps of the ground during a ride. The seating height (H) is adjustable by virtue of the fact, that the shock absorber (4) can be attached to several points (12.1–12.3) on the gliding part (1). The ground gliding vehicle can be folded up, in order to occupy less volume during transportation. When driving, the driver in essence sits upright on the seating structure (3) and looks in the direction of travel (x), so that his feet touch the ground each on one side of the gliding part (1). The driver can wear short—or extremely short skis on his feet. The ground gliding vehicle is steered mainly by the transfer of weight. The ground gliding vehicle can also be steered and/or braked with the feet. It is foreseen in particular as a snow sports apparatus and provides a riding enjoyment unknown up until now, whereby the advantages of skis are combined with the advantages of sledges.

8 Claims, 6 Drawing Sheets

VEHICLE FOR GLIDING OVER THE GROUND

The invention refers to a vehicle for gliding over the ground, which can be utilized in particular as a snow sports apparatus.

The object of the invention is to create a novel ground gliding vehicle, in particular a snow sports apparatus with at least one seat and in preference one runner. This ground gliding vehicle shall provide an up until now unknown riding enjoyment, whereby the advantages of skis—the capability to make tight curves, good braking capability, cross-country terrain suitability—shall be combined with the advantages of sledges (toboggans)—a seated position while riding.

The object is solved by the ground gliding vehicle, as it is defined in the independent patent claim. It has a gliding part facing the ground, at least one supporting structure placed upon it and at least one seating structure attached to this supporting structure, whereby means to hold on to the supporting—and/or seating structure are attached.

The gliding part consists either of one runner or of several runners located immediately adjacent to one another. The gliding part is at least long enough to provide sufficient stability in longitudinal direction, but at most so long, that the ground gliding vehicle can still be easily steered. The width of the gliding part corresponds approximately to that of an ordinary ski and under the load of one person should prevent an excessive sinking into the substrate, e.g., into snow. The gliding part can be designed especially for the ground gliding vehicle in accordance with the invention or else it can consist of a commercially available ski, short ski, snowboard, etc.

The supporting structure is in preference equipped with at least one shock absorber, in order to absorb shocks during the ride, which emanate from unevenness or bumps on the ground. The ground gliding vehicle is in addition equipped with means for holding on, e.g., grips or handles, which are located on the supporting—and/or seating structure. These means for holding on enable the driver to hold on to the ground gliding vehicle during the ride and/or to more easily steer the ground gliding vehicle. The ground gliding vehicle can in preference be folded up or taken to pieces, so that during transportation in a folded up condition it occupies less volume and can more easily be carried than in the ready to ride condition.

The shock absorber can be equipped with an adjusting mechanism, with which mechanical characteristics of the shock absorber can be adjusted. Thus the shock absorber can be adjusted and optimized for a certain driver weight, a particular driving style, a terrain to be driven on. Such possibilities can be of importance in particular for applications in racing sports.

The ground gliding vehicle in accordance with the invention can have at least one sensor, with which a physical value such as, e.g., the driver's weight, the air—or snow temperature, the relative humidity of the air, the atmospheric pressure, the altitude above sea level, the running speed,. the radiation of the sun, etc., can be measured and the result of the measurement issued as an electrical output signal. The sensor signal, e.g., can be utilized for controlling the mechanical characteristics of the shock absorber. The sensor output signal or also the time or other information can be indicated by means of a display.

When riding, the driver in essence is seated upright on the seating structure and looks in the direction of travel, so that his feet can make contact with the ground each of them on one side of the gliding part. In order to make it possible for drivers with different leg lengths to drive with the same ground gliding vehicle, and/or to adapt the ground gliding vehicle to the terrain to be driven on, to the snow conditions, etc., it is advantageous if the supporting structure makes an adjustment of the seat height and/or of the height of the grips or handles. possible. An adjustment of the seating structure and/or of the means for holding on in longitudinal direction can be foreseen too.

It is at the drivers discretion to wear short or extremely short skis (as, e.g., are well-known under the designation "Big foot") on his feet or not when driving the ground gliding vehicle in accordance with the invention. The ground gliding vehicle is steered mainly by a transfer of weight, which in essence is produced by the driver inclining his torso sideways. For braking, a braking device can be foreseen on the ground gliding vehicle. Such a braking device can, e.g., be designed as a lever fixed to the supporting structure, which can be turned, the upper end of which is actuated by hand and the lower end of which moves into engagement with the substrate. More complicated braking devices—similar to a bicycle brake—could have a brake lever, which can rotate, fixed to a handle, from where the braking force is transferred e.g., through a cable on to a "scratcher" engaging the substrate. The ground gliding vehicle in accordance with the invention can also be steered and/or braked with the feet; in order to increase the effect, special braking soles can be attached to the shoes. For the ground gliding vehicle means for fixing to a ski-lift T-bar can be foreseen. Such means are in preference fixed on to the front part of the ground gliding vehicle at seat height, e.g., on the means for holding on and/or on the seating structure ,and they are preferably symmetrical to the longitudinal axis. A means for the fixing to a ski-lift T-bar, e.g., could be designed as a rope loop, which is fixed to the ground gliding vehicle in the manner described above, looped around the ski-lift T-bar and which can be held by the driver during the journey on the ski-lift.

In order to reduce the risk of injury, in particular in case of falls, the ground gliding vehicle in preference does not have any sharp ends, edges or points.

In the following, the invention is described in detail with the help of figures. Schematically illustrated in doing so are.

Figure 1:
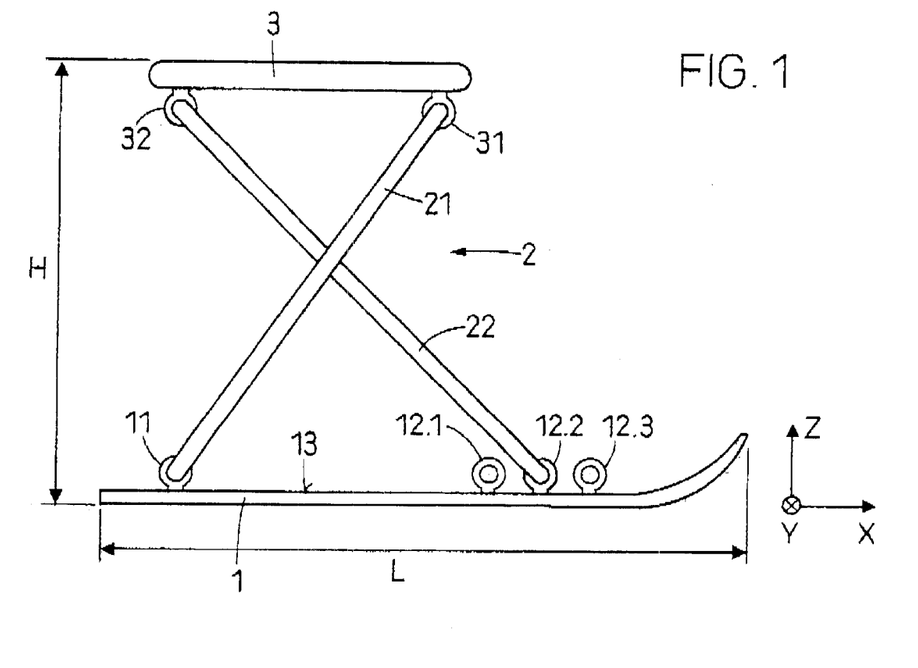
FIG. 1 a side view of an embodiment of the ground gliding vehicle in accordance with the invention, FIGS. 2 and 3 side views of two embodiments of the ground gliding vehicle in accordance with the invention with shock absorbers, FIG. 4 a top view of one of the embodiments of FIGS. 1–3, FIG. 5 a side view of further embodiment of the ground gliding vehicle in accordance with the invention, FIG. 6 a top view of the embodiment of FIG. 5, FIGS. 7 and 8 top views of two further embodiments of the ground gliding vehicle in accordance with the invention, FIG. 9 a side view of a further embodiment of the ground gliding vehicle in accordance with the invention, FIG. 10 a top view of the embodiment of FIG. 9, and FIG. 11 a side view of a "tandem" embodiment of the ground gliding vehicle in accordance with the invention.

FIG. 1 schematically illustrates a first embodiment of a ground gliding vehicle in accordance with the invention. The ground gliding vehicle has a gliding part facing the ground 1, a supporting structure 2 placed upon it and a seating structure 3 attached to this supporting structure 2. The foreseen direction of travel in this depiction corresponds to the (+x)—direction. "Front" in this documents signifies "in "+x)—direction", "back" signifies "in (-x)—direction". "Vertical" in this documents signifies "in (+z)—or (-z)—direction"; "top", resp., "bottom" signify "in (+z), -direction", resp., "in (-z)—direction".

The gliding part 1 of the exemplary embodiment in depicted in FIG. 1 consists of exactly one runner. The gliding part 1 can be designed expressly for the ground gliding vehicle in accordance with the invention, or else it can consist of one or several commercially available skis, short skis, snowboards or similar objects. In preference, the gliding part 1 is manufactured with processes and materials, as are familiar from skis. The gliding part 1 is at least long enough to provide a sufficient stability in longitudinal direction x, at most, however so long, that the ground gliding vehicle can still be easily steered. The length of the gliding part 1 should therefore fulfil the condition $0.5 \text{ m} \leq L \leq 1 \text{ m}$; lengths L with $0.6 \text{ m} \leq L \leq 0.8 \text{ m}$ have proved to be particularly advantageous.

The seating structure 3 can be similar to a motorcycle— or bicycle saddle or also different, e.g., constructed of wickerwork. It can optionally be equipped with upholstery.

The supporting structure 2 as connection between the gliding part 1 and the seating structure 3 in the example of execution of FIG. 1 consists of two supporting elements 21 and 22, which are connected respectively with the gliding part 1 and the seating construction 3 at attachment points 11, 12.2, 31, 32. The supporting elements 21, 22 can, e.g., be made of aluminium. The seating height H determines the position of the centre of gravity of driver and ground gliding vehicle, which is essential for the running characteristics. Good running characteristics result, when the centre of gravity is 0.5–0.7 m above the ground. The height H of the seating structure 3 above the gliding part 1 should therefore fulfil the condition $0.3 \text{ m} \leq H \leq 0.6 \text{ m}$, preferentially $0.4 \text{ m} \leq H \leq 0.5 \text{ m}$.

It is advantageous if the seating height H is adjustable, so that it can be adapted to drivers with legs of different length and/or in order to set up the ground gliding vehicle for the terrain to be driven on. In the embodiment of FIG. 1, the seating height can be adjusted, e.g., by having a supporting element 22, which can be attached to the gliding part 1 on different attachment points 12.1, 12.2, 12.3 (located next to one another in x-direction). Prerequisite for this is, that the supporting elements 21, 22 are attached to the other attachment points 11, 31, 32 rotatable around an axis in y-direction. It could also be advantageous to adjust the seating position in longitudinal direction (x-direction) relative to the gliding part 1; for the expert it is easy to implement such a possibility of adjustment. If as the gliding part 1 a commercially available (short -) ski is utilized, then a (not depicted) adapter for the connection of the short ski with the supporting structure can be foreseen. The adapter then has to be designed in such a manner, that it can be strapped to the ski with the existing ski binding.

It is furthermore desirable, that the ground gliding vehicle can be folded up in direction, i.e., that its height, resp., its volume can be reduced. In the folded up condition it occupies less volume than in the ready to ride condition. Thus it can be more easily carried and transported, e.g., in a rucksack. The ground gliding vehicle of FIG. 1, e.g., can be folded up by releasing a supporting element 22 from the gliding part 1; the seating structure 3 then practically comes to lie on the top 13 of the gliding part 1.

Figure 2:
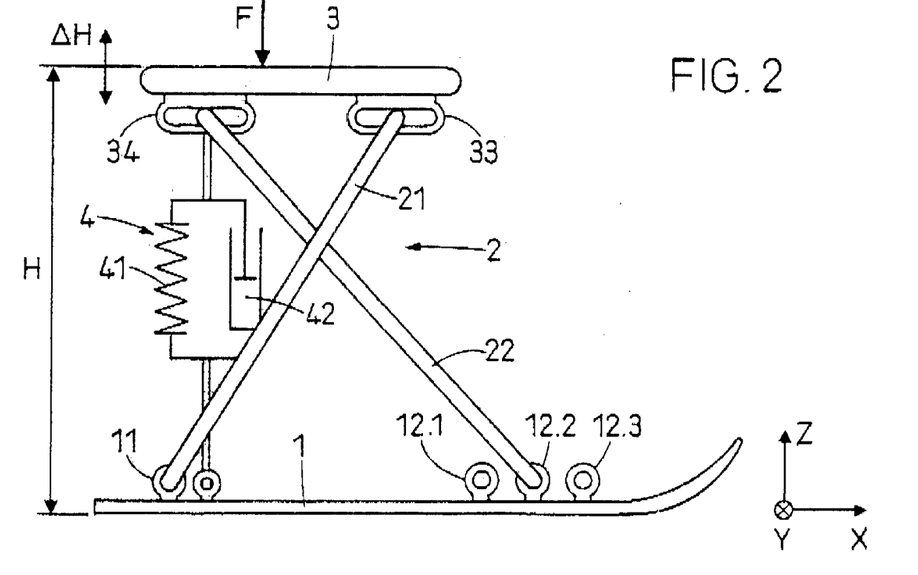

While the seating structure 3 in the embodiment of FIG. 1 is rigidly connected to the gliding part 1 in the ready to ride condition, in the embodiment of FIG. 2 it is movable at least by some centimeters in z-direction, i.e., the seating height H in the ready to ride condition is variable by a distance ΔH. In y- and z-direction, however, the seating structure 3 is immovable. This is made possible, e.g., by the guides 33, 34 on the seating structure 3, which make possible movements in x-direction of the upper ends of the supporting elements 21, 22 and by attachment devices 11, 12.2 on the gliding part 1, which enable a rotation of the supporting elements 21, 22 around a y-axis.

Figure 3:
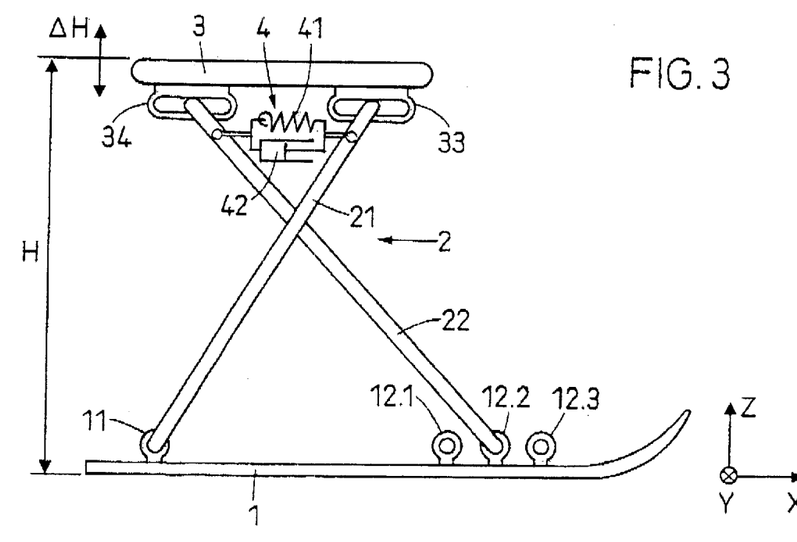

The embodiment of FIG. 2 now has a shock absorber 4, consisting of a spring element 41 and a damper element 42, which are arranged in parallel. The spring element 41 exerts an opposing force, as soon as a vertically directed force F acts on the seating structure 3. It transmits forces in z-direction between the gliding part 1 and the seating structure 3 and therefore absorbs shocks resulting from running over uneven or bumpy ground. The damper element 42 dampens the oscillation caused by this. The spring travels can amount to some centimeters up to 20 cm. Such shock absorbers 4 are familiar from motor vehicle construction. Very similar demands with respect to spring -, resp., damping characteristics, robustness, etc., are made, e.g., of the suspensions of cross-country bicycles ("mountain bikes"), in particular of those for downhill riding ("downhill"). The damper element 42 could be made do without, which would result in a more simple, cheaper, but less comfortable embodiment. It goes without saying, that the supporting structure 2 and the shock absorber 4 can be constructed and arranged differently than illustrated in FIG. 2. An example for a slight variation of the embodiment of FIG. 2 is depicted in FIG. 3. Here the shock absorber 4 is located between the supporting elements 21, 22, which results in a similar effect as the arrangement of FIG. 2. While the spring element 41 in FIG. 2 is subject to pressure, in FIG. 3 it is subject to tension.

Figure 4:
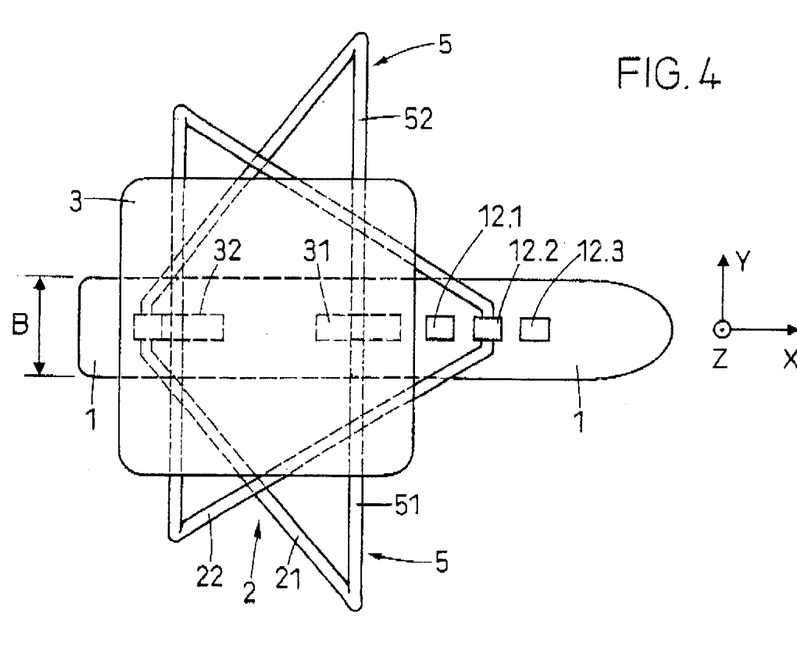

FIG. 4 illustrates a schematical top view of one of the embodiments of the FIGS. 1–3, whereby the shock absorber 4 for the sake of simplicity is not depicted. In order to better illustrate the supporting structure 2, the seating structure 3 is drawn as transparent in FIG. 4. The supporting structure 2 consists of two trapeze-shaped supporting elements 21, 22, which are fitted into one another and which, e.g., are manufactured out of aluminium tubes.

The width B of the gliding part 1 approximately corresponds to that of an ordinary ski and should prevent an excessive sinking into the substrate, e.g., into snow, when loaded with one person. For snow, the width B of the gliding part 1 should fulfil the condition $8 \text{ cm} \leq B \leq 20 \text{ cm}$, in preference $10 \text{ cm} \leq B \leq 13 \text{ cm}$. Of course the width of the gliding part B (x) can also vary in function of the longitudinal coordinate x.

The ground gliding vehicle in accordance with the invention is equipped with means for holding on, which make it possible for the driver to hold on to the ground gliding vehicle during the ride and/or more easily steer the ground gliding vehicle. In the embodiment of FIG. 4, the means for holding on consist of two handles 51 and 52, which are located respectively on the right-hand—and left-hand side of the seating structure 3 on the supporting structure 2 at the level of the seating structure 3. Here the handles are parts of a supporting element 21, which are aligned in the y-direction. They are therefore directly formed out of the supporting structure 2, which of course does not necessarily have to be the case. The means 5 for holding on are preferably located within the front part of the ground gliding vehicle, therefore on the front part of the supporting structure 2 or in front of the seating structure 3.

Figure 5:
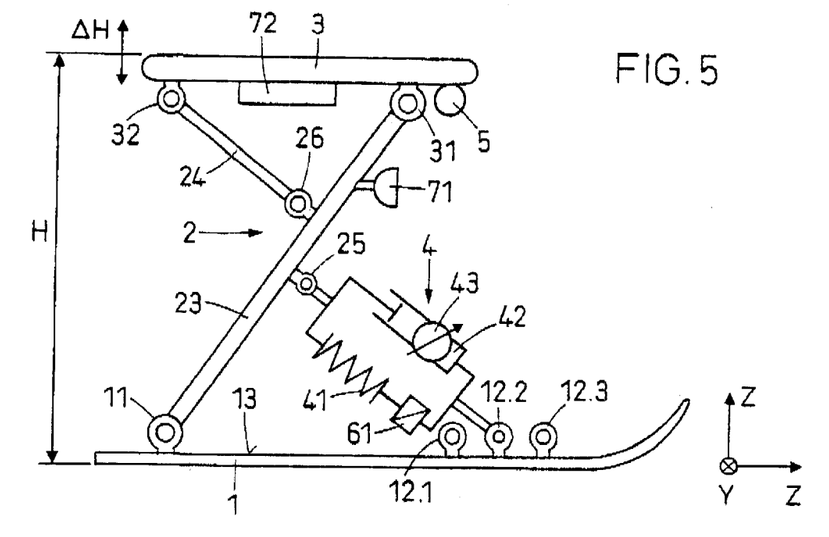
Figure 6:
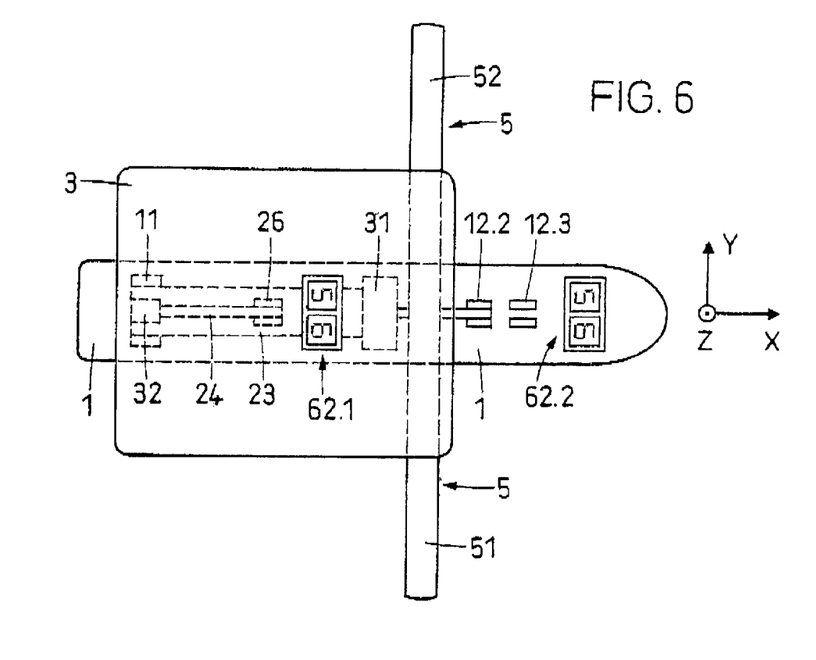

A further exemplary embodiment of the ground gliding vehicle in accordance with the invention is schematically illustrated in the FIGS. 5 and 6. The supporting structure 2 here consists of an arm 23, the lower end of which is fixed to the upper side 13 of the gliding part 1 by means of a hinge 11. The arm 23, e.g., consists of wood. At one upper end of the arm, the supporting structure 3 is attached, resp., supported by an additional supporting element 24. The arm 23 is supported by a shock absorber 4 subject to pressure, which is attached to the gliding part 1. The seating height H can also be adjusted here, due to the fact, that the attachment of the shock absorber 4 to the gliding part 1 is possible at several x - positions 12.1, 12.2 12.3. This embodiment is also easily folded up, inasmuch as, e.g., the connection 25 between the shock absorber 4 and the arm 23 or the connection 12.2 between the shock absorber 4 and the gliding part 1 and simultaneously one of the connections 26, 32 of the additional supporting element 24 are released. The shock absorber 4 could also be replaced with a rigid supporting element. The means 5 for holding on in this embodiment are located on the seating structure 3; they could, however, also, e.g., be attached to the arm 23.

The shock absorber 4 can be equipped with an adjusting mechanism 43, by means of which mechanical characteristics of the shock absorber 4, such as the suspension and/or dampening, are adjustable. For this purpose, the adjusting mechanism 43 can contain assigned adjusting elements, such as, e.g., screws or motors, which have to be adjusted by hand. With the adjusting mechanism 43, e.g., the shock absorber 4 can be adjusted and optimized to a certain weight of the driver, a particular style of driving, a terrain to be driven over, etc.. Such possibilities can be important in particular for an application in racing sports. The ground gliding vehicle in accordance with the invention can be equipped with at east one sensor 61. This can, e.g., be a force—or pressure sensor attached to the supporting structure 2, which records the driver's weight and converts it to a corresponding electric signal. Such a sensor signal could be utilized for adjusting the adjusting mechanism 43, resp., for controlling it as a control variable. The sensor 61, however, could also measure other values, such as, e.g., the air—or snow temperature, the relative humidity of the air, the atmospheric pressure, the altitude above sea level, the travelling speed, the sun radiation, etc.

Furthermore, the ground gliding vehicle in accordance with the invention can be equipped with at least one display 62.1, 62.2. This, e.g., can be located on the seating structure 3 (62.1) and/or in, resp., on the gliding part 1 (62.2). The display 62.1, 62.2 is in preference digital. It indicates, e.g., the values measured by the sensor 61 of one or several physical values, the time or other information.

On the ground gliding vehicle in accordance with the invention at least one light source 71, e.g., a headlight illuminating in forward direction can be attached. Such a light source 71 could be advantageous in particular in the case of rides at night, in order to, e.g., illuminate the terrain to be driven over. The light source 71 can be powered by a battery 72. The (rechargeable) battery 72 can be charged through an electric mains power socket or also with solar cells, which, e.g., can be located in the area of the display 62.2.

Figure 7:
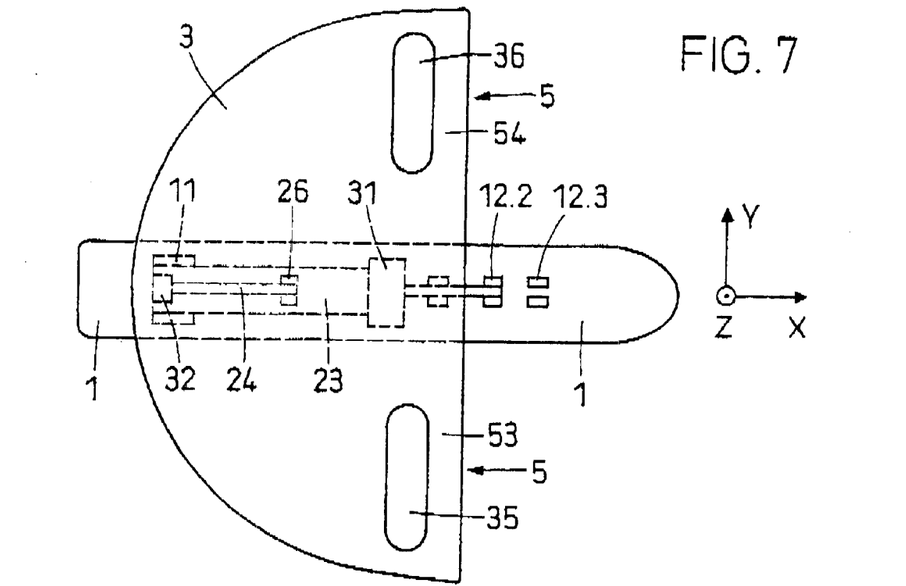

A further embodiment of the ground gliding vehicle in accordance with the invention is illustrated in a schematical top view in FIG. 7. In this, the gliding part 1, the supporting structure 2 and a possible shock absorber 4 can be the same as in the case of the embodiment of the FIGS. 5 and 6. Designed differently, however, are the seating structure 3 and the means for holding on 5. In the wide front part of the seat 3, laterally two holes 35, 36 are located. The driver can thus hold on to the front limits 53, 54 of these holes 35, 36; the means for holding on are therefore directly shaped out of the seating structure 3. In this embodiment the front part of the seating structure 3 has to be designed to be sufficiently wide for the driver while seated to be able to still hold on with his hands, therefore that the bottom, resp., the thighs of the driver can be accommodated between the handles 53, 54.

Figure 8:
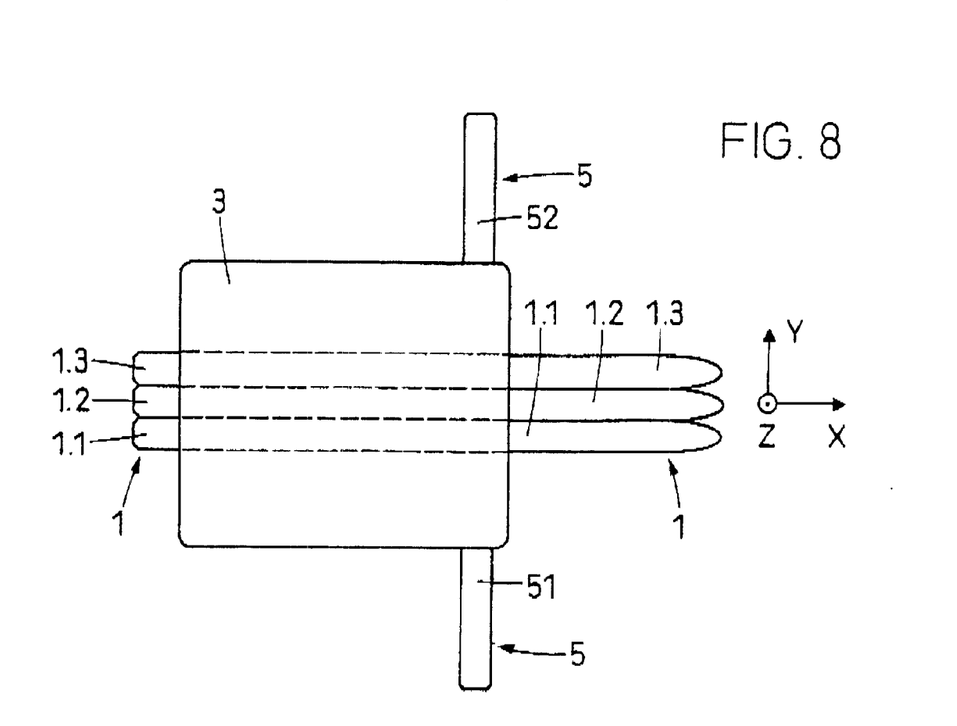

In FIG. 8, an embodiment of the ground gliding vehicle in accordance with the invention is illustrated, where the gliding part 1 has several, e.g., three runners 1.1, 1.2, 1.3 immediately adjacent to one another. Such an arrangement of two or more runners 1.1–1.3 located immediately adjacent to one another can provide the benefit of a greater lateral stability in comparison with a single runner. Apart from this, this embodiment is similar to that of the FIGS. 5 and 6. The supporting structure 2 for reasons of clarity is not indicated anymore.

Figure 9:
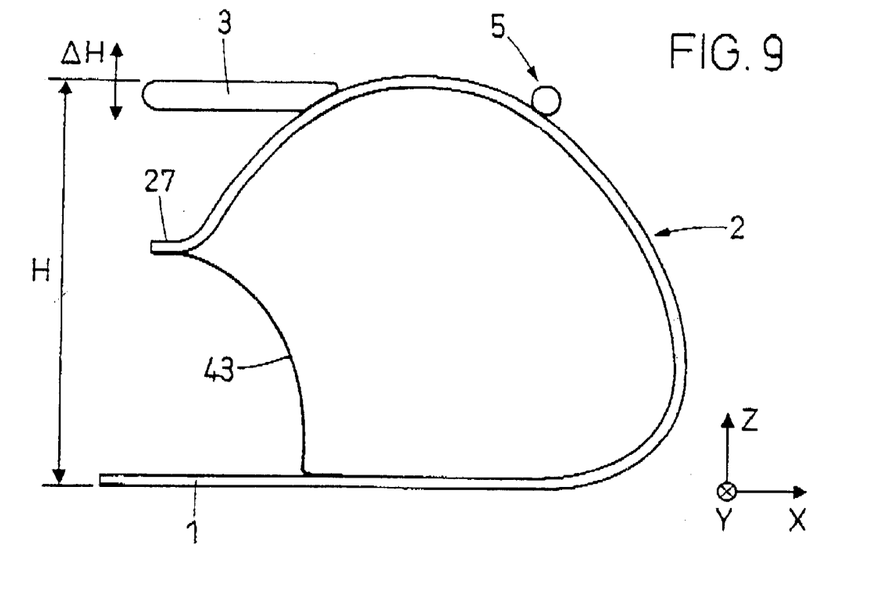
Figure 10:
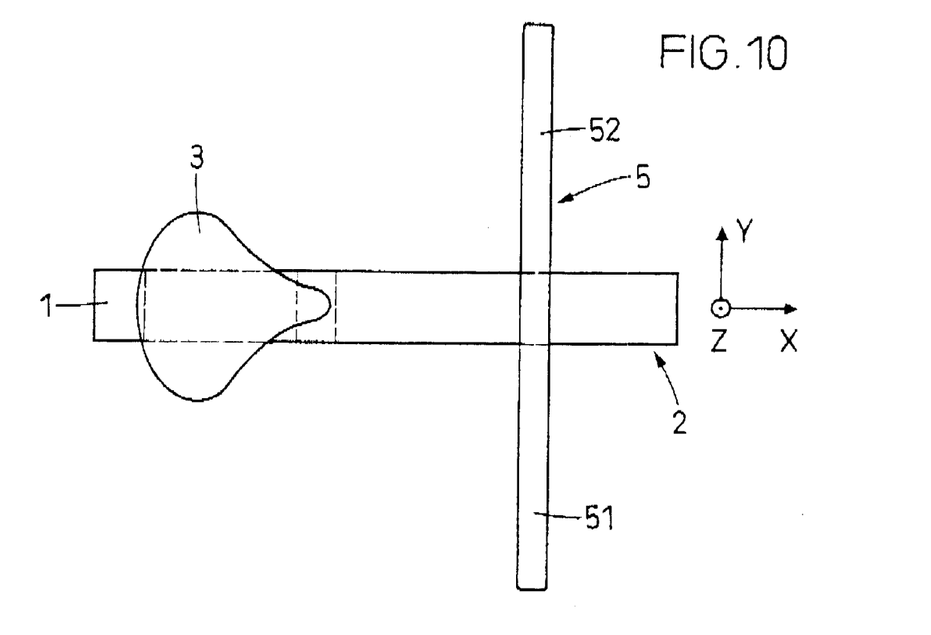

FIGS. 9, resp., 10 schematically illustrate a side view, resp., a top view of a further embodiment of the ground gliding vehicle in accordance with the invention. Here the gliding part 1 and the bow-shaped supporting structure merge into one another without any break, which contributes to a particularly elegant appearance. They can be manufactured from a single piece, e.g., of wood. The free end 27 of the supporting structure 2 can be supported with a spring element 43, in this case, e.g., with a bent simple spring made of metal. Of course the bow-shaped supporting structure 2 on its own already results in a spring effect, so that this embodiment is equipped with two spring elements 43, 2.

The seating structure 3 of the embodiment of FIGS. 9 and 10 is constructed as a bicycle saddle and is directly attached to the supporting structure 2. They are located, the same as in the embodiments described above, approximately at seat height, somewhat further forward, however, than the seating structure 3. The position of the seating structure and of the means for holding on 5 can be adjusted in x-direction and/or in z-direction with simple elements, which are not depicted here.

Figure 11:
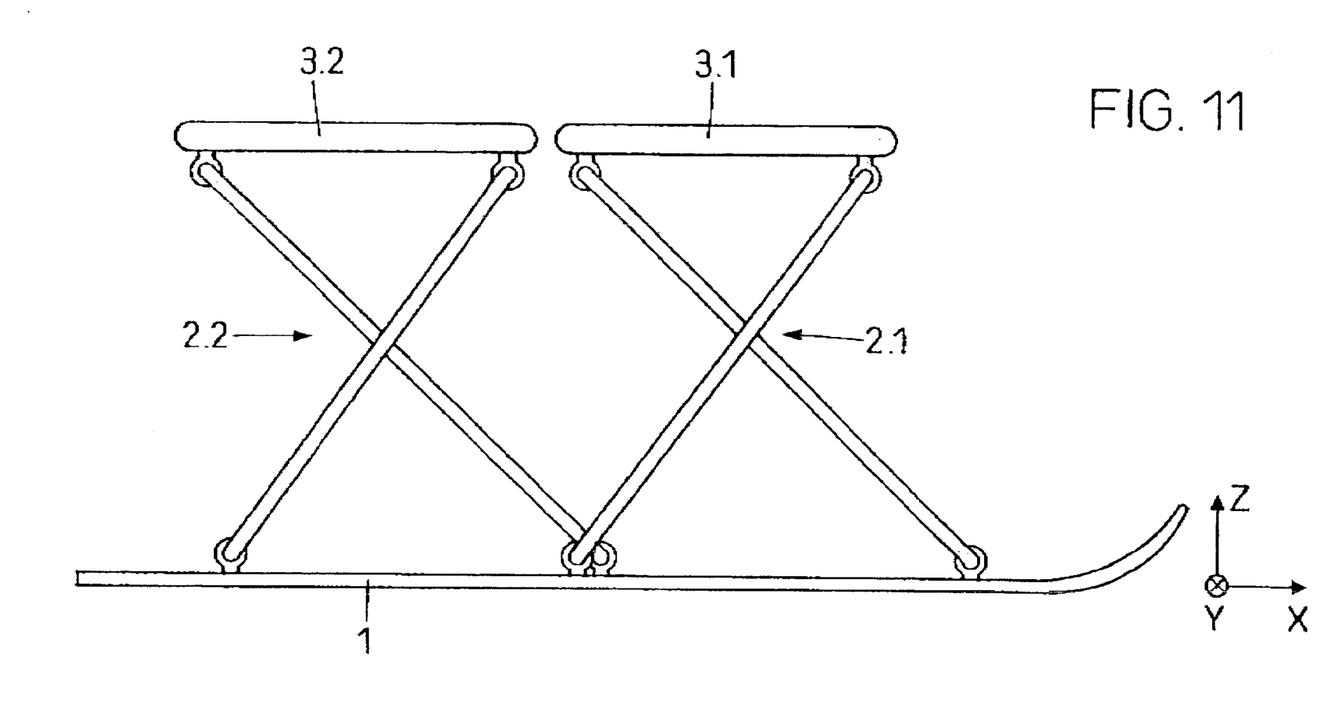

In FIG. 11, finally a "tandem" embodiment of the ground gliding vehicle in accordance with the invention is illustrated. This has two supporting structures 2.1, 2.2, which are placed on the gliding part 1 and two seating structures 3.1, 3.2, which are attached to the supporting structures 2.1, 2.2. Further details, such as means for holding on, shock absorbers, sensor or display are not illustrated in FIG. 11, they can, however, quite well be present. In another embodiment, two seating structures can also be attached to a single supporting structure. With knowledge of the invention, the expert is in a position to design and construct a multitude of further embodiments of the ground gliding vehicle in accordance with the invention.

What is claimed is:

1. A vehicle for gliding over the ground in a forward gliding direction, comprising a gliding part with a top surface and a surface facing the ground, the gliding direction defining a forward x direction, a direction away from the ground defining a z direction, a direction perpendicular to the x and z direction defining a y direction;

a foldable supporting structure attached to the top surface of the gliding part, said supporting structure comprising seating structure and first and second supporting elements, each element having first and second ends, said first ends of the first and second supporting elements attached to the top surface of the gliding part, said first and second supporting elements extending upwardly in the z direction from the top surface of the gliding part;

wherein the seating structure is attached to the second ends of the first and second supporting elements, wherein one of the second ends is attached at a forward point of the seating structure and the other second end is attached at a rearward point of the seating structure;

one of said forward point and said rearward point comprising a guide allowing attachment of the second end of the support element to the guide and permitting movement of the attached second end only in the x direction in relation to the seating structure;

said support structure further comprising a spring element extending downwardly in the z direction from said rearward point;

first and second means for holding on attached to the supporting structure; and wherein the gliding part, supporting structure, and the seating structure are rigid in the y direction.

2. The vehicle of claim 1 wherein a damper element is provided in parallel with the spring element.

3. The vehicle of claim 1 wherein the spring element is separate from the supporting element connected with the rearward point.

4. The vehicle of claim 1 wherein the seating structure is adapted in width to support human buttocks.

5. The vehicle of claim 1 wherein the length of the gliding part is between 0.5 m and 1 m, and the width of the gliding part is between 0.08 m and 0.2 m.

6. The vehicle of claim 1 wherein the gliding part comprises exactly one runner.

7. The vehicle of claim 1 wherein the gliding part comprises two or more runners, which are located immediately adjacent to each other.

8. The vehicle of claim 1 wherein the means for holding on are two handles.

* * * * *